Oct. 3, 1967  R. M. SHERMAN  3,345,034
GATE VALVE ASSEMBLY
Filed Dec. 27, 1965  3 Sheets-Sheet 1
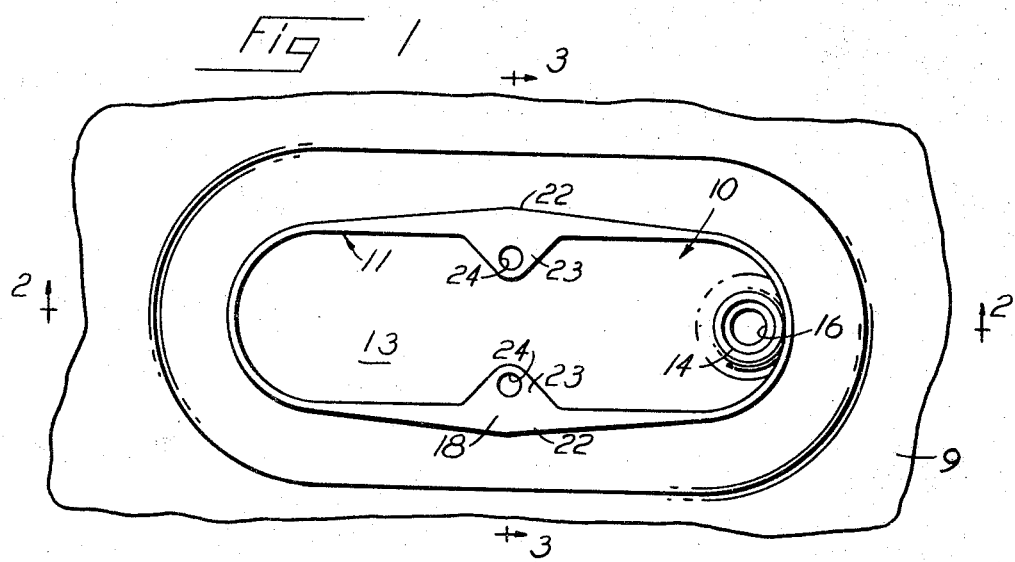
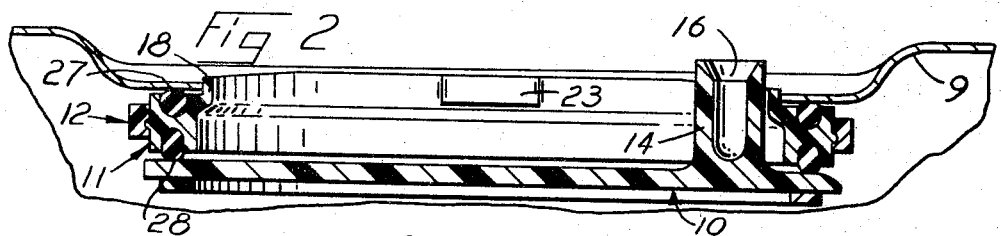
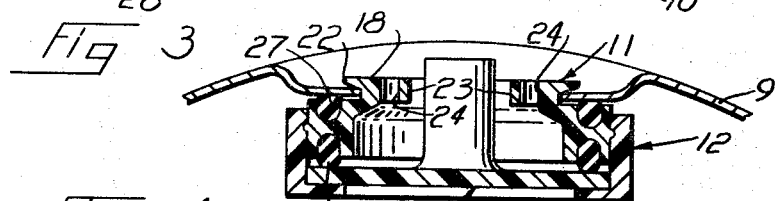
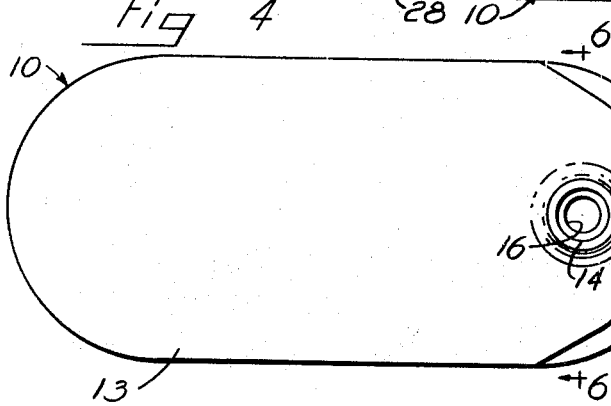
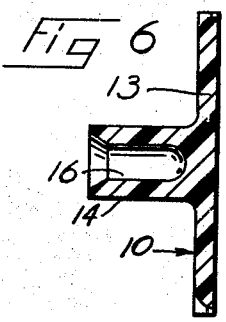
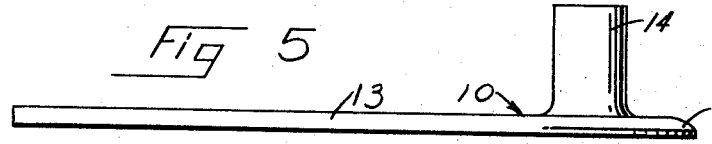
INVENTOR.
ROGER M. SHERMAN
BY Wells & St.John
ATTYS.

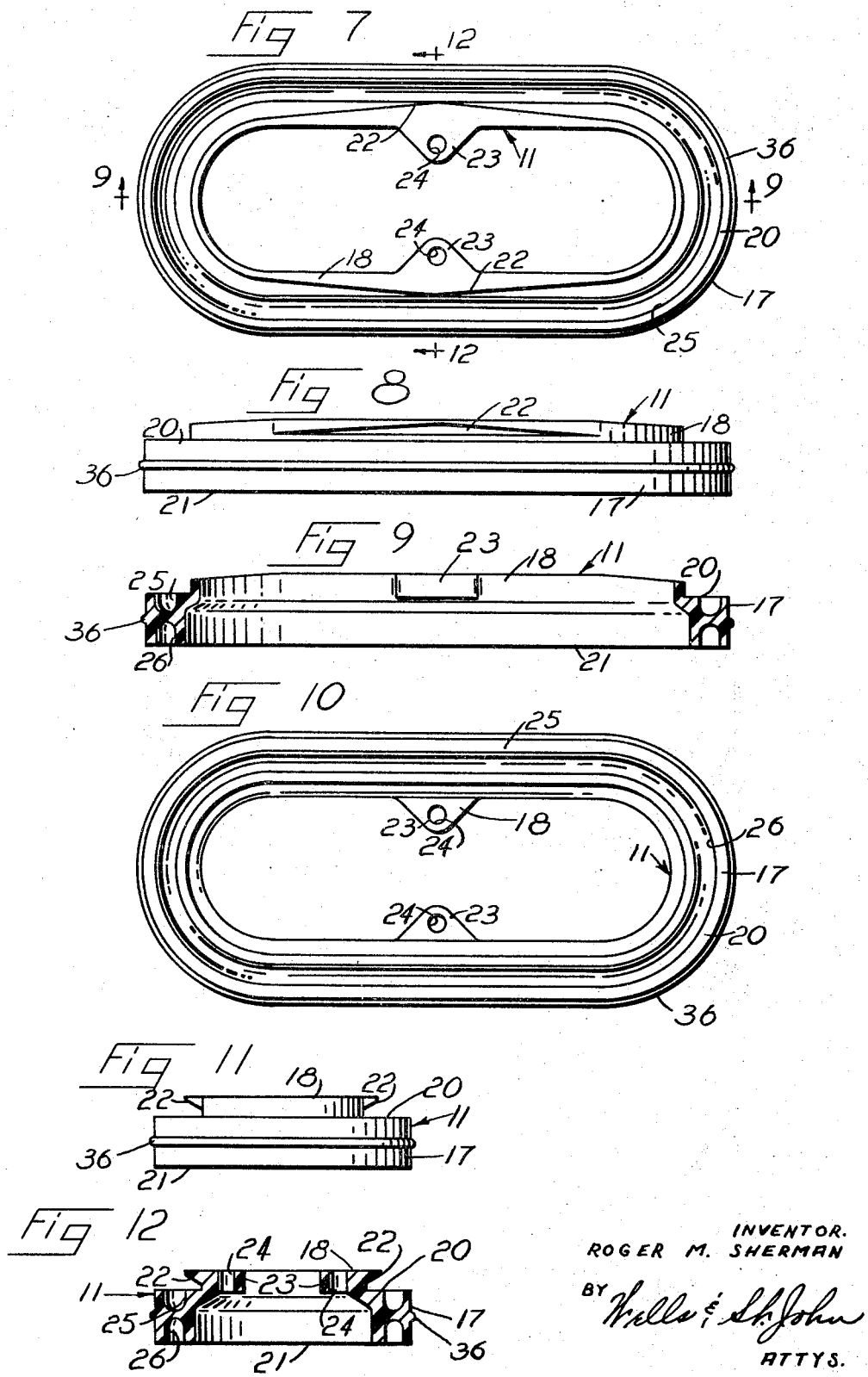

Oct. 3, 1967 R. M. SHERMAN 3,345,034
GATE VALVE ASSEMBLY
Filed Dec. 27, 1965 3 Sheets-Sheet 3
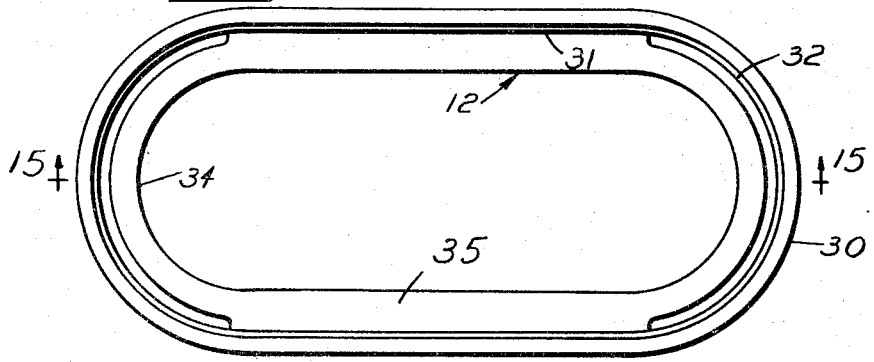
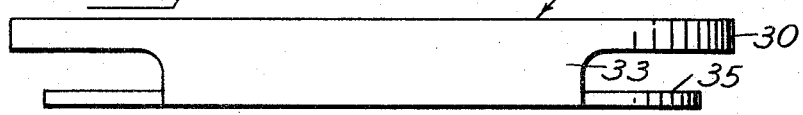
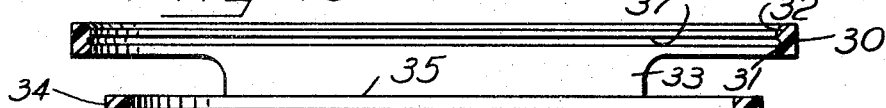
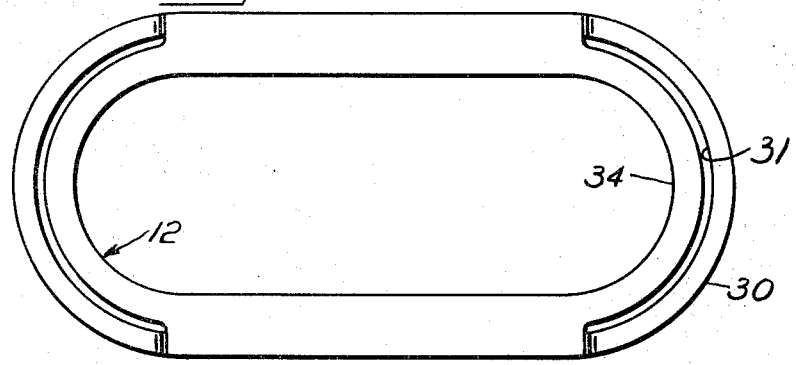
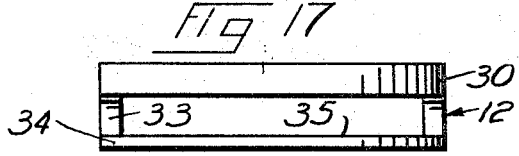
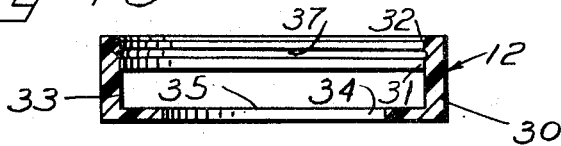
INVENTOR.
ROGER M. SHERMAN
BY *Wells & St.John*
ATTYS.

United States Patent Office 3,345,034
Patented Oct. 3, 1967

3,345,034
GATE VALVE ASSEMBLY
Roger M. Sherman, Santa Clara, Calif., assignor to Aluminum Supply Company, Tubing Division, Inc., Spokane, Wash., a corporation of Washington
Filed Dec. 27, 1965, Ser. No. 516,232
7 Claims. (Cl. 251—326)

ABSTRACT OF THE DISCLOSURE

This disclosure is concerned with a gate valve assembly recessed in an irrigation pipe. It includes cooperatively connected rigid members which slidably support a longitudinal slide and which sealingly engage both the slide and the pipe by means of recessed oval gasket members or O-rings. The valve is mounted in a complementary aperture in the pipe by means of outwardly protruding ledges which can be yieldably urged inward to permit the valve to be wedged into place. The entire apparatus can be molded of rigid or semi-rigid resins for durability.

---

This invention relates to a sliding gate valve assembly for irrigation pipe.

The present invention is concerned with a gate valve assembly for irrigation pipe usage where apertures at the side of the pipe are selectively opened to flood field areas adjacent to the pipe.

The gate valves with which the present improvement is concerned are used to flood irrigated fields, permitting water to exit from a supply pipe. The valves are designed to be installed at the point of use, rather than at a factory where the pipe is fabricated. In addition, the individual valves are designed so as to be replaceable in the field, an effective seal against the pipe surfaces being assured by the design of the valve assembly. Removal or insertion of a gate valve constructed as described below is mechanically very simple ad consumes little time.

The valve is designed to be mounted flush within the pipe so that no part of the valve protrudes beyond the normal circumference thereof. However, the slide handle preferably protrudes slightly above the recessed body of the valve, so that it can be moved longitudinally by an external object, such as the blade of a shovel. The position of the valve assembly within the pipe permits it to withstand high internal pressures without bursting from the pipe, as is necessary along lengths of pipe leading to the field area to be flooded.

A first object of this invention is to provide a gate valve that can be mounted within a pipe in a position flush with or within the normal circumferential boundary of the pipe exterior.

Another object of this invention is to construct such a valve of rigid material capable of withstanding long exterior use under differing weather conditions without deteriorating.

Another object of this invention is to couple the rigid molded body of a gate valve with replaceable resilient sealing members to provide an effective liquid seal both against the walls of the pipe on which the gate valve assembly is mounted and also against the valve slide itself.

Another object of this invention is to provide a molded rigid valve member that can be easily inserted within a pipe opening and can be readily removed for replacement purposes.

Another object of this invention is to provide a fully molded slide member and supporting valve body structure which can be economically produced by injection molding techniques.

These and further objects will be evident from a study of the following disclosure taken together with the accompanying drawings, which illustrate a preferred form of the invention. It is to be understood that this form of the invention is only presented by way of example, and that other equivalent forms could be substituted with varying degrees of effectiveness.

In the drawings:

FIGURE 1 is a fragmentary view of a pipe section showing the complete valve assembly in place;

FIGURE 2 is a fragmentary longitudinal sectional view taken along line 2—2 in FIGURE 1;

FIGURE 3 is a fragmentary transverse sectional view taken along line 3—3 in FIGURE 1;

FIGURE 4 is a top plan view of the slide;

FIGURE 5 is a side elevation view of the slide;

FIGURE 6 is a sectional view through the slide as seen along line 6—6 in FIGURE 4;

FIGURE 7 is a top plan view of the valve placement member;

FIGURE 8 is a side elevation view of the valve placement member shown in FIGURE 7;

FIGURE 9 is a sectional view taken along line 9—9 in FIGURE 7;

FIGURE 10 is a bottom view of the valve placement member;

FIGURE 11 is an end view of the valve placement member;

FIGURE 12 is a sectional view taken along line 12—12 in FIGURE 7;

FIGURE 13 is a top plan view of the lower guide member;

FIGURE 14 is an elevation view of the lower guide member shown in FIGURE 13;

FIGURE 15 is a sectional view taken along line 15—15 in FIGURE 13;

FIGURE 16 is a bottom view of the lower guide member;

FIGURE 17 is an end view of the lower guide member; and

FIGURE 18 is a sectional view taken along line 18—18 in FIGURE 13.

The gate valve assembly shown in FIGURES 1, 2, and 3 is constructed of three basic members. These are the longitudinally shiftable slide 10, the valve placement member 11, and the lower guide member 12. The function of slide 10 is to provide a movable closure for the longitudinal pipe aperture. The valve placement member 11 serves to locate and support the valve assembly in the opening of the irrigation pipe. The lower guide member 12 encloses slide 10 and slidably supports its lower surface.

The valve is shown in FIGURES 1, 2, and 3 as assembled within an oval shaped opening in a length of irrigation pipe 9. The opening of pipe 9 has a longitudinal oval configuration. The area adjacent the pipe opening is indented as shown in FIGURES 2 and 3 so that the immediate portions of pipe 9 adjacent to the oval opening lie in a single plane.

The slide 10 is shown in detail in FIGURES 4, 5, and 6. It comprises a smooth surfaced main body 13 having an oval exterior configuration and constructed with sufficient thickness to withstand substantial changes in temperature and pressure without deformation. Body 13 is provided with an upstanding handle 14 adjacent one of its ends. This end of the body 13 is tapered downwardly as shown at 15. Handle 14 is provided with a central aperture 16 for insertion of a handle engaging tool as will be described below.

The valve placement member 11 is shown in detail in FIGURES 7 through 12. It comprises a main oval body 17 which has both length and width dimensions greater than those of the aperture formed in pipe 9. The center of body 17 has an oval aperture formed therethrough coaxially with the exterior configuration of body 17. This aperture is bounded by an upstanding rim 18 whose outside periphery is complementary to the interior configuration of the pipe aperture within which the member 11 is secured. The height of rim 18 is slightly greater than the thickness of pipe 9. Body 17 is provided with parallel top and bottom surfaces 20, 21.

Protruding outwardly at each side of rim 18 are two ledges 22. The ledges 22 increase in width toward the center of member 11. At their outer ends, they merge integrally into the structure of rim 18. They are provided with a tapered lower surface which is spaced upwardly from the top surface 20 of the body 17. The minimum separation between the lower surfaces of the respective ledges 22 and the top surface 20 of the body 17 are slightly greater than the thickness of pipe 9. The ledges 22 are utilized to overlap the upper surface of pipe 9 at each side of the valve assembly when located in a pipe, as best seen in FIGURES 1 and 3.

Also formed integrally with rim 18 on the valve placement member 11 are tabs 23, which extend inwardly from rim 18 at the respective sides of the member 11. The tabs 23 are located at the center of member 11 in alignment with the widest portions of ledges 22. Each tab 23 has an aperture 24 formed therethrough about an axis parallel to the axis of the aperture formed through the center of body 17. The respective apertures 24 are designed to receive the prongs of a tool (not shown) for forcing the tabs 23 toward one another so that the rigid material used to form member 11 can be deformed slightly to permit entry of the pipe opening edges beneath the respective ledges 22. The tabs 23 are sufficiently thick to permit the use of the necessary pressure to effect this temporary deformation.

Body 17 is provided with two peripheral grooves 25 and 26 formed respectively in the top and bottom surfaces 20 and 21. These grooves extend completely about the aperture at the center of body 17. The grooves 25, 26 are designed to seat resilient O-rings designated by the numerals 27 and 28 respectively in FIGURES 2 and 3. The upper groove 25 has a width substantially equal to the diameter of the resilient ring 27 and a depth just slightly greater than the radius of ring 27 so as to seat ring 27 with a minimum amount of stretching of the ring 27 itself. Groove 26, however, preferably grips the ring 28 quite securely. This is accomplished by having groove 26 formed with a width less than the diameter of ring 28 and a depth greater than the radius of ring 28. The circumferential measurement of ring 28 is also less than that of groove 26, so that the ring 28 must be stretched and squeezed into the confines of groove 26. The reasons for this will be apparent later.

The valve assembly is completed by the slide retaining and guide member 12. It also is formed with a main body 30 that is shaped in the form of an oval. It has a central oval shaped aperture formed therethrough. The upper interior corner of surface 31 is tapered as shown at 32. Along its sides, the body 30 has integral extensions 33 which protrude downwardly and support an integral plane lower section 34. The section 34 is located inwardly of the interior surface 31 of body 30 and also has an oval central aperture formed coaxially with body 30. The upper surface 35 of portion 34 is planar, as is its bottom surface.

The exterior oval walls of the member 11 are complementary to the interior oval walls of member 12. The two are designed to be interlocked by means of a peripheral ridge 36 formed on the body 17 of member 11 and a complementary groove 37 formed in the interior surfaces 31 of the body 30 of member 12. The manner in which the two members 11 and 12 interlock is believed to be clearly shown in FIGURES 2 and 3. To avoid relative motion between the members, the diameter of ridge 36 is preferably slightly greater than the diameter of groove 37.

In the construction of the valve assembly, rings 27, 28 are first located within the respective grooves 25 and 26 designed to properly seat them. As described, ring 27 is more loosely fitted than the lower ring 28. The slide 10 is then loosely positioned between the ring 28 and the portion 34 of the retaining member 12. Member 12 is then secured to member 11 by snapping the two parts together. The ridge 36 is received within the groove 37 in a tight fitting relationship so that the members 11 and 12 are not easily disengaged. However, they can be disengaged when necessary by prying between the members 11 and 12. The clearance provided by the small taper 32 on the body 30 of member 12 assists in the assembly of members 11 and 12 by eliminating the otherwise sharp corner presented.

The slide 10 is resiliently held between the compressed ring 28 and the lower portion 34 of the retaining member 12. There is considerable pressure exerted on the ring 28, particularly when the valve assembly is mounted in a pipe with hydraulic pressure against it. For this reason, it has been found necessary to securely mount ring 28 as described, so that it will remain in place during sliding movement of the body 13 of slide member 10. Should ring 28 become dislodged, it is necessary to disassemble the valve in order to properly replace it. For the same reason, the tapered front moving edge 15 of the slide member 10 assists in properly sealing the body 13 against ring 28 without forcing ring 28 from its proper position within groove 26.

The valve assembly can be readily inserted in the field or at its point of sale. After the necessary oval aperture has been properly cut and formed in pipe 9, the valve placement member 10 is gripped by a tool (not shown) having depending prongs that are respectively received within the apertures 24 of tabs 23. The tool is used first to simply grip the valve so that it can be inserted through the pipe aperture in a longitudinal position. The valve assembly must be inserted longitudinally through the pipe aperture and then pulled back upwardly toward the aperture in its proper aligned position. To lock the valve placement member 11 within the pipe aperture, one of the side ledges 22 is first slipped over the exterior pipe surface. The tool that grips tabs 23 through apertures 24 is then used to urge the tabs 23 toward one another, taking advantage of the rigid nature of the molded material used to form member 11. The member 11 is deformed just sufficiently to permit the remaining ledge 22 to slip over the top surface of the pipe opening, the tool then being released. The wedging nature of the lower surfaces of the respective ledges 22 will serve to properly seat the rigid body 17 of member 11 within the confines of the pipe aperture. The protruding ring 27 will contact the underside of the pipe opening about the entire periphery of the pipe aperture, thereby sealing the interior of the pipe. A second seal is provided about the entire perephery of the slide 10 by the resilient ring 28 engaged therewith when the slide 10 is in its closed position.

When slide 10 is closed as shown in FIGURES 1, 2, and 3, interior hydraulic pressure will be exerted on the large underside surface of the slide member 10 and also against the outer unexposed surfaces of rings 27 and 28, which will be compressively held against the underside of the pipe surface and the upper surface of the slide member 10 respectively. The greater the interior hydraulic pressure, the greater will be the compressive forces exerted by the rings 27 and 28 to resist leakage.

The slide 10 can be opened any desired amount by moving it, using the protruding handle 14. Handle 14 can be manually moved by inserting a suitable tool within the aperture 16 or by simply shoving it with the blade of a shovel or hoe. Handle 14 protrudes slightly above the upper surfaces of member 11 for just this purpose. However, it is to be noted that the entire valve assembly is recessed flush within the normal circumferential boundaries of pipe 9, as can be seen in FIGURE 3.

The tabs 23 and apertures 24 can also be used to mount open ended flexible tubes in sealing engagement with the aperture formed through members 11 and 12 so that water can be more positively directed from within pipe 9 if so desired.

The members 10, 11 and 12 are preferably molded by injection molding techniques, using a rigid resin material capable of withstanding the temperature extremes to which the valve assembly will be subjected in field use without deteriorating due to weather conditions. Also, a resin material having suitable bearing qualities is desirable, since the slide 10 and the retaining member 12 are in direct sliding contact with one another. In addition, the material must have the rigidity necessary to permit the rim 18 to be manufactured with a minimum thickness so as to not unnecessarily restrict the opening formed in pipe 9. One advantage of using a rigid material in this application is the increase in the cross sectional area of the effective valve opening as compared to that provided by previously used materials. A suitable material which has been used in the manufacture of this valve assembly is "Cycolac," a resin produced by the Marbon Division of the Borg-Warner Corporation. Another example of a suitable resin is "Kraylastic MM," made by the U.S. Rubber Company. While other rigid resins might be used, these suitable resins are generally classed as "rigid" resins and are thermoplastic. They are generally known as A.B.S. resins (acrylonitrile-butadiene-styrene).

Despite the preferred use of resin in molding the valve components, they could be formed of other rigid materials, e.g. metals. Certain steel and aluminum alloys which would permit sufficient displacement to insert the valve in pipe could be used. The restricted movement before permanent damage or set would be much smaller than in the case of resins, and would require closer tolerances.

It is obvious that minor modifications can be made in the valve structure as shown in detail in the drawings without deviating from the basic concepts of the invention. Therefore, it is to be understood that the following claims are intended as the only limiting definitions of the invention.

Having thus described my invention, I claim:

1. A gate valve assembly for irrigation pipe, comprising:
   a first rigid member having parallel top and bottom surfaces, said first member having an aperture formed therethrough centered about an axis perpendicular to its top and bottom surfaces;
   an upstanding rim formed integrally with said first member and centered about said axis, said rim being located about the periphery of the aperture formed through said first member;
   outwardly directed ledges formed integrally with said first member and protruding outwardly from said rim at opposite sides thereof, said ledges having lower surfaces spaced from the top surface of said first member;
   first sealing means mounted on the upper surface of said first member and protruding upwardly therefrom, said sealing means extending continuously about the aperture formed in said first member;
   second sealing means mounted on the lower surface of said first member and protruding downwardly therefrom, said second sealing means extending continuously about the aperture formed in said first member;
   a second rigid member secured to said first member having a central aperture formed therethrough coaxially with the aperture of said first member, said second member having an upwardly directed surface parallel to and spaced from the bottom surface of said first member and surrounding the aperture formed through said second member, the ends of said second member being open directly above said upwardly directed surface; and
   a rigid slide mounted between the bottom surface of said first member and the upwardly directed surface of said second member for reciprocating movement relative to said first and second members.

2. A gate valve assembly as defined in claim 1, wherein the exterior configuration of said first member is complementary to the interior configuration of said second member, whereby a portion of said first member is received within a portion of said second member;
   and a complementary ridge and grove formed respectively about the circumferences of the exterior portion of said first member and interior portion of said second member adapted to releasably secure said first and second members relative to one another.

3. A gate valve assembly as defined in claim 1, wherein each of said first and second members is formed of a molded rigid resin material.

4. A gate valve assembly as defined in claim 1, wherein each of said first and second members and said slide are molded of rigid resin material.

5. A gate valve assembly as defined in claim 1, wherein said slide has an upstanding handle portion formed integrally therewith adjacent one longitudinal end thereof, the upper elevation of said handle being above the uppermost surfaces of said first and second members when assembled.

6. An apparatus as defined in claim 1 further comprising:
   means formed integrally with the rim of said first member to permit said ledges to be forced inwardly toward one another.

7. An apparatus as defined in claim 6 wherein said last-named means comprises:
   a pair of inwardly directed ears formed integrally with said rim and protruding inwardly therefrom in a plane substantially equal to that of said ledges, each of said ears being provided with an aperture formed therethrough about an axis parallel to the axis of the aperture formed through said first member, whereby an exterior device can be exerted through said apertures in said ears to thereby permit said ears to be drawn toward one another.

References Cited

UNITED STATES PATENTS

| | | | |
|---|---|---|---|
| 2,652,946 | 9/1953 | Beatty | 251—326 X |
| 2,771,904 | 11/1956 | Sherman et al. | 251—145 X |
| 2,925,244 | 2/1960 | Fox | 251—145 |
| 3,232,577 | 2/1966 | Sargent | 251—326 X |

M. CARRY NELSON, *Primary Examiner.*

A. ROSENTHAL, *Assistant Examiner.*